Figure 1:
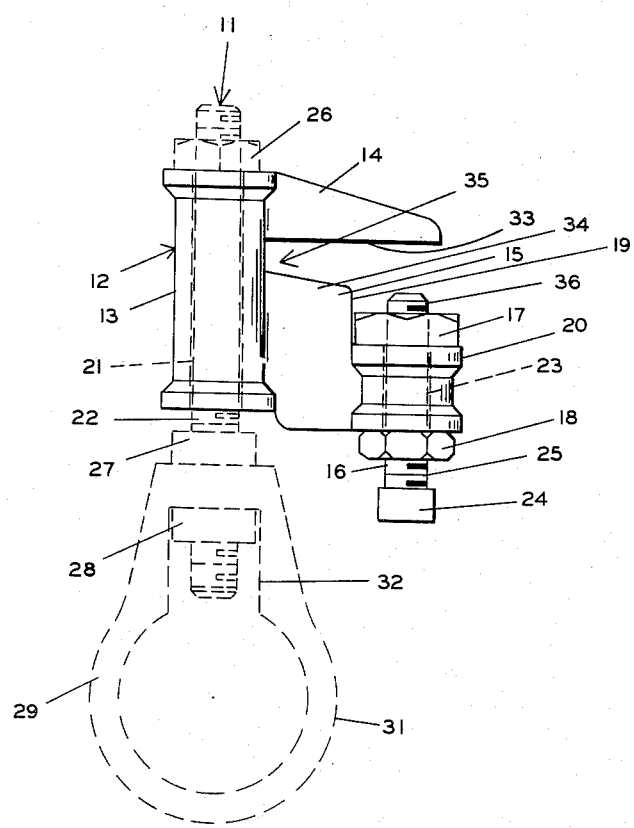

June 13, 1961 P. V. METCALFE 2,988,316
CLAMP
Filed Oct. 16, 1958

INVENTOR.
PAUL V. METCALFE
BY
*Jerome R. Cox*
ATTORNEY 2,988,316
CLAMP
Paul V. Metcalfe, 1401 Doten Ave., Columbus 12, Ohio
Filed Oct. 16, 1958, Ser. No. 767,614
3 Claims. (Cl. 248—228)

The invention disclosed and claimed in this application relates to clamps.

The invention is useful in a wide variety of fields. It is especially useful in connection with the problem of providing support for pipes used in automatic sprinkler systems which are widely used for minimizing fire damage and destruction. It is illustrated and described therefore in connection with such an automatic sprinkler system installation.

Automatic sprinkler systems for minimizing fire damage are used extensively. Such sprinkler systems often include a plurality of supply pipes arranged to extend horizontally adjacent to and parallel with the ceiling of the building protected. Hangers are usually provided to support such supply pipes. These hangers are usually supported by clamps which are secured to a rafter, beam or other supporting structure. Heretofore the clamps used have usually been ordinary C-clamps of substantially conventional design and construction which are attached to steel I-beams so that the weight of the C-clamp and the hanger supported thereby and the pipe supported by the hanger all bear upon the set screw with which the C-clamp is provided. Such structures are not always satisfactory, especially where vibration is excessive.

I propose to improve this structure by providing a clamp which I have devised, wherein a set screw is provided, wherein the set screw is below the supporting member rather than above, wherein a substantially horizontal tapered notch is provided into which the I-beam fits, and wherein means are provided to prevent the nut which secures the set screw from being turned relative to the clamp.

Objects

One of the objects of my invention, therefore, is the provision of a new type of clamp;

A further object of my invention is to provide a clamp for pipe hangers which is not subject to maladjustment even during times of excessive vibration;

A further more specific object of my invention is the provision of a new clamp especially designed for the support of pipe hangers for automatic sprinkler fire prevention systems.

I have shown for illustration of my invention an embodiment thereof consisting of a specially formed clamp having a tapered notch, having a set screw therefor bearing upwardly against the supporting structure, having a locking nut for the set screw, and having means for preventing the locking nut on the set screw from turning.

In the drawings:

The figure is a view in side elevation of the embodiment of my invention referred to; a supported automatic sprinkler system pipe hanger being shown in dotted lines.

Referring still to the drawing for a detailed description of the embodiment of my invention illustrated, it may be seen that I have shown a clamp 11 consisting of a casting 12 having a main cylindrical portion 13, a generally triangular support arm 14, and a clamping arm 15. The clamp 11 includes also a set screw or bolt 16, a nut 17, and a nut 18. The main cylindrical portion 13 of the clamp 11 is bored as at 21 (but not tapped) for insertion therethrough of a threaded rod 22. The clamping arm 15 is formed with a vertical shoulder 19 which holds the nut 17 from turning relative thereto. It is also provided with a cylindrical extension or barrel 20 which is bored as at 23 for the reception therethrough of the set screw or bolt 16, said set screw being formed with a head 24 and with threads 25. Secured on the set screw or bolt 16 are the nuts 17 and 18 which secure the bolt 16 in the bore 23.

The threaded rod 22 is provided with a nut 26 by which it is supported in the clamp 11. It is also provided with nuts 27 and 28 by which it supports and secures and holds adjustably a pipe hanger 29. The pipe hanger 29 is provided with a ring portion 31 and with a constricted throat portion 32, the former (i.e. the ring portion 31) being provided for snugly holding the pipe supported thereby and the constricted opening 32 being provided to hold the nut 28 in its proper adjustment and prevent it from turning relative to the hanger 29.

The support arm 14 is provided with a substantially horizontal lower face 33 which forms the main support for the clamp on the I-beam. The clamping arm 15 is provided with a sloping face 34 forming a small angle to the horizontal which cooperates with the face 33 to form a tapering slot 35 into which the I-beam or other supporting member is inserted. Thus the I-beam member is clamped in the slot 35 between the horizontal face 33 and the sloping face 34. It is also clamped by the set screw 16 between the face 33 and the hardened upper point 36 of the screw 16.

Operation

The clamp 11 is suspended from a fixed support, preferably an I-beam by being positioned relative to the I-beam so that the face 33 rests upon the I-beam and so that the tapered surface 34 contacts with the I-beam immediately below it. Then the bolt or set screw 16 is adjusted so that the hardened point 36 thereof also contacts firmly with the bottom part of the I-beam and secures the clamp thereto. In adjusting the set screw 16 it is desirable to first screw the nut 18 down on the screw until it contacts with or is close to the head 24, then the nut 17 is placed upon the top of the cylindrical extension 20 so that the opening in the nut 17 is aligned with the bore 23 and so that the nut 17 is contacting with the shoulder 19 of the clamping arm 15. The bolt 16 is then pushed up through the untapped bore 23 and threaded into the tapped bore of the nut 17 until the hardened head 35 of the bolt 16 contacts firmly and securely with the I-beam on which the clamp is suspended. The shoulder 19 prevents rotation of the nut 17. The lock nut 18 is then screwed to the position shown so that it clamps the lower end of the cylindrical extension or barrel 20. The hanger 29 is thus suspended securely upon the I-beam of the clamp 11.

It is to be understood that the above described embodiment of my invention is for the purpose of illustration only and various changes may be made therein without departing from the spirit and scope of the invention.

I claim:

1. A clamp comprising a casting formed with a main cylindrical portion having a vertical bore extending therethrough, a support arm having a substantially horizontal lower face, and a clamping arm vertically below said supporting arm having a sloping upper face, said clamping arm having also a substantially vertically extending cylindrical extension having a vertical bore extending therethrough formed integrally therewith and said horizontal lower face and said sloping upper face forming a tapered notch by which said clamp may be secured firmly to a supporting structure in combination with a set screw bolt extending through said cylindrical extension, and a pair of nuts threaded on said bolt with one above and one below said cylindrical extension for adjustably holding the bolt in clamping position wherein the supporting structure is wedged firmly in the notch and is clamped securely at a spaced point between an outer portion of said horizontal lower face and the set screw bolt.

2. A clamp comprising a casting formed with a main cylindrical portion having a vertical bore extending therethrough, a support arm having a substantially horizontal lower face, and a clamping arm vertically below said supporting arm having a sloping upper face and one vertical face, said clamping arm having also a substantially vertically extending cylindrical extension having a vertical bore extending therethrough formed integrally therewith and said horizontal lower face and said sloping upper face forming a tapered notch by which said clamp may be secured firmly to a supporting structure in combination with a set screw bolt extending through said cylindrical extension, and a pair of nuts threaded on said bolt with one above and one below said cylindrical extension for adjustably holding the bolt in clamping position, wherein said supporting structure may be wedged in said tapered notch and clamped at a spaced point between said horizontal lower face and said set screw bolt, the nut above said extension being held against rotation relative to the clamp by the vertical face of the clamping arm.

3. A clamp comprising a casting formed with a substantially vertically extending main cylindrical portion having a vertical bore extending therethrough, a support arm having a substantially horizontal lower face, and a clamping arm vertically below said supporting arm, said clamping arm having a substantially vertical cylindrical extension having a vertical bore extending therethrough formed integrally therewith, said clamping arm also being formed with a sloping upper face which cooperates with the substantially horizontal lower face to form a tapered notch by which said clamp may be secured firmly to a supporting structure, and said clamping arm being also formed with a vertical face in combination with a set screw bolt extending through said cylindrical extension, wherein said supporting structure may be wedged within said tapered notch and clamped at a spaced point from said tapered notch between said horizontal lower face and said set screw bolt, and a pair of nuts threaded on said bolt with one above and one below said cylindrical extension for adjustably holding the bolt in clamping position, the nut above said extension being held against rotation relative to the clamp by the vertical face of the clamping arm.

References Cited in the file of this patent
UNITED STATES PATENTS

| | | |
|---|---|---|
| 369,971 | Stillman | Sept. 13, 1887 |
| 416,755 | Schoenike | Dec. 10, 1889 |
| 1,470,642 | Ready | Oct. 16, 1923 |
| 1,523,597 | Lang | Jan. 20, 1925 |
| 2,510,436 | Trammell | June 6, 1950 |
| 2,659,561 | Kindorf | Nov. 17, 1953 |